US011186162B2

(12) United States Patent
Schwekutsch et al.

(10) Patent No.: US 11,186,162 B2
(45) Date of Patent: Nov. 30, 2021

(54) TWIN SYSTEM ELECTRIC ALL-WHEEL DRIVE SUPPLEMENTARY DRIVE AXLE

(71) Applicant: BorgWarner Inc., Auburn Hills, MI (US)

(72) Inventors: Michael Schwekutsch, Palo Alto, CA (US); Robert F. Keller, Chesterfield, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 16/085,183

(22) PCT Filed: Mar. 13, 2017

(86) PCT No.: PCT/US2017/022069
§ 371 (c)(1),
(2) Date: Sep. 14, 2018

(87) PCT Pub. No.: WO2017/160702
PCT Pub. Date: Sep. 21, 2017

(65) Prior Publication Data
US 2019/0077247 A1 Mar. 14, 2019

Related U.S. Application Data

(60) Provisional application No. 62/308,259, filed on Mar. 15, 2016.

(51) Int. Cl.
*B60K 1/00* (2006.01)
*B60K 6/48* (2007.10)
(Continued)

(52) U.S. Cl.
CPC .................. *B60K 6/48* (2013.01); *B60K 1/02* (2013.01); *B60K 6/52* (2013.01); *B60K 17/16* (2013.01);
(Continued)

(58) Field of Classification Search
CPC .. B60K 1/02; B60K 7/007; B60K 6/40; B60L 3/0046; B60L 15/007
See application file for complete search history.

(56) References Cited

U.S. PATENT DOCUMENTS 3,913,004 A * 10/1975 Alexander .............. H02M 1/22
363/109
5,289,890 A * 3/1994 Toyoda .................... B60K 1/02
180/65.8
(Continued)

FOREIGN PATENT DOCUMENTS

| CN | 102596617 A | 7/2012 |
| CN | 105383278 A | 3/2016 |
| EP | 1136310 A2 | 9/2001 |

OTHER PUBLICATIONS

International Search Report and Written Opinion; dated Mar. 23, 2017; for International Application No. PCT/US2017/022069; 20 pages.
(Continued)

*Primary Examiner* — Hau V Phan
(74) *Attorney, Agent, or Firm* — Young Basile Hanlon & MacFarlane, P.C.

(57) ABSTRACT

A number of variations may include a product comprising a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly.

8 Claims, 3 Drawing Sheets

(51) Int. Cl.
  *B60K 1/02* (2006.01)
  *B60K 17/16* (2006.01)
  *B60K 17/22* (2006.01)
  *B60K 6/52* (2007.10)
  *B60K 17/354* (2006.01)
  *B60K 17/356* (2006.01)
  *B60K 17/34* (2006.01)
  *B60K 5/04* (2006.01)

(52) U.S. Cl.
  CPC .............. *B60K 17/22* (2013.01); *B60K 17/34* (2013.01); *B60K 17/354* (2013.01); *B60K 17/356* (2013.01); *B60K 5/04* (2013.01); *B60K 2006/4816* (2013.01); *B60Y 2200/92* (2013.01); *F16H 2200/0021* (2013.01); *Y02T 10/62* (2013.01)

(56) References Cited

U.S. PATENT DOCUMENTS

| | | | | |
|---|---|---|---|---|
| 5,365,153 A * | 11/1994 | Fujita | ............ | B06B 1/0261 318/34 |
| 5,512,022 A * | 4/1996 | Suzuki | ............ | B60K 1/02 475/2 |
| 5,537,011 A * | 7/1996 | Bachman | ............ | B60L 15/20 318/99 |
| 5,934,397 A * | 8/1999 | Schaper | ............ | B60G 3/01 180/65.245 |
| 6,107,761 A * | 8/2000 | Seto | ............ | B60K 1/02 180/179 |
| 6,295,487 B1 | 9/2001 | Ono et al. | | |
| 6,364,806 B1 * | 4/2002 | Spaniel | ............ | B60K 1/02 477/3 |
| 6,708,788 B2 * | 3/2004 | Kuwayama | ............ | B60K 1/02 180/65.6 |
| 7,224,146 B2 * | 5/2007 | Poore | ............ | H02J 7/1492 322/28 |
| 8,011,461 B2 * | 9/2011 | Rodriguez | ............ | B60K 6/40 180/65.23 |
| 8,276,693 B2 * | 10/2012 | Scarbo | ............ | B60K 7/0007 180/65.1 |
| 8,872,455 B2 * | 10/2014 | Tremel | ............ | H02P 29/0241 318/400.22 |
| 9,457,658 B2 * | 10/2016 | Knoblauch | ............ | B60K 1/02 |
| 2006/0230854 A1 * | 10/2006 | Enstrom | ............ | B60K 6/36 74/331 |
| 2008/0070733 A1 | 3/2008 | Diemer et al. | | |
| 2009/0211824 A1 | 8/2009 | Knoblauch et al. | | |
| 2010/0049390 A1 | 2/2010 | Supina et al. | | |
| 2011/0031049 A1 | 2/2011 | Silveri et al. | | |
| 2011/0192660 A1 | 8/2011 | Chodura et al. | | |
| 2011/0196555 A1 | 8/2011 | Hennings et al. | | |
| 2011/0287888 A1 | 11/2011 | Muller et al. | | |
| 2012/0258831 A1 | 10/2012 | Knoblauch et al. | | |
| 2013/0241445 A1 * | 9/2013 | Tang | ............ | B60L 15/2036 318/52 |
| 2014/0066247 A1 | 3/2014 | Smetana et al. | | |
| 2014/0152093 A1 * | 6/2014 | Wald | ............ | B60L 3/0046 307/10.1 |
| 2014/0349799 A1 * | 11/2014 | Kaltenbach | ............ | B60K 6/48 475/5 |
| 2015/0054337 A1 * | 2/2015 | Ogale | ............ | B60L 15/007 307/10.1 |
| 2015/0107408 A1 * | 4/2015 | Kaltenbach | ............ | B60K 6/365 74/661 |
| 2015/0151634 A1 | 6/2015 | Smetana | | |
| 2016/0052382 A1 | 2/2016 | Clark et al. | | |
| 2016/0146322 A1 | 5/2016 | Knoblauch | | |
| 2018/0119779 A1 | 5/2018 | Knoblauch et al. | | |

OTHER PUBLICATIONS

Press Information—ZF Friedrichshafen AG Corporate Communication; Compact, Lightweight, Powerful: ZF's Electric Axle Drive to Enter Volume Production in 2018; 5 Pages.

* cited by examiner

TWIN SYSTEM ELECTRIC ALL-WHEEL DRIVE SUPPLEMENTARY DRIVE AXLE

CROSS-REFERENCE TO RELATED APPLICATIONS

This application claims the benefit of U.S. Provisional Application No. 62/308,259 filed Mar. 15, 2016.

TECHNICAL FIELD

The field to which the disclosure generally relates to includes vehicle powertrains.

BACKGROUND

A vehicle powertrain may include a transmission.

SUMMARY OF ILLUSTRATIVE VARIATIONS

A number of variations may include a product comprising a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly.

A number of variations may include a product comprising: a first electrical machine and a second electrical machine operatively connected to at least one input shaft; a gearbox comprising at least one gear train, wherein the gearbox is operatively connected to the at least one input shaft; and at least one axle assembly operably connected to the gearbox; wherein the first electrical machine and the second electrical machine are constructed and arranged to drive the gearbox; and wherein the gearbox is constructed and arranged to drive the at least one axle assembly.

A number of variations may include a method for driving a first wheel and a second wheel comprising: providing a first electrical machine and a second electrical machine; driving a gearbox with output from the first and the second electrical machine; driving at least one axle assembly with output from the gearbox; and driving a first wheel and a second wheel with output from the at least one axle assembly.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
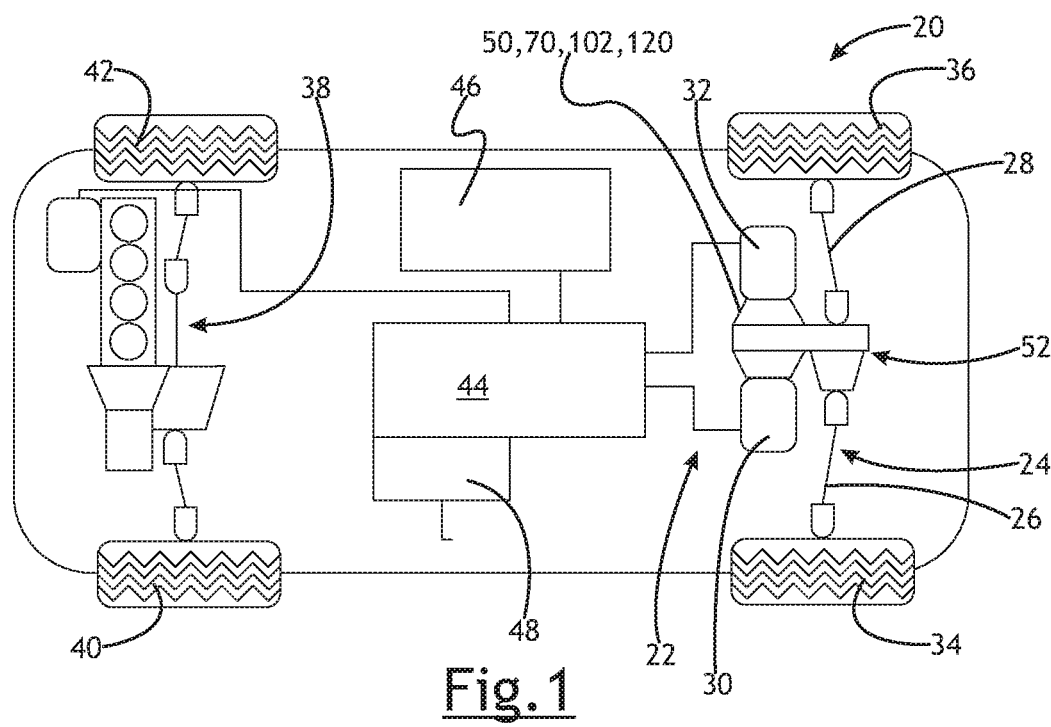
FIG. 1 illustrates a schematic of a vehicle driveline according to a number of variations.

Referring to FIG. 1, in a number of variations, a vehicle 20 may include a twin system transmission 22. In a number of variations, the twin system transmission 22 may include a first electrical machine 30 and a second electrical machine 32 which may drive a gearbox 50, 70, 102, 120 to drive an axle assembly 24 connected to a first wheel 34 and a second wheel 36. In a number of variations, driving the axle assembly 24 with the first and second electrical machine 30, 32 may improve traction and vehicle dynamics of the vehicle 20. Any number of electrical machines 30, 32 may be used including, but not limited to, a motor, a motor-generator, or another type of electrical machine. The electrical machines 30, 32 may be low voltage including, but not limited to, 48 volts or may be high voltage including, but not limited to, 300-400 volts. In a number of variations, the axle assembly 24 may include a first axle shaft 26, a second axle shaft 28, and a differential 52 therebetween. The axle assembly 24 may be in any number of positions in the vehicle 20 including, but not limited to, the rear axle in a front-wheel drive vehicle or the front axle in a rear-wheel drive vehicle. In a number of variations, the vehicle 20 may include a vehicle controller 44 which may be operatively connected to the first electrical machine 30 and the second electrical machine 32 and may be used to control the first and second electrical machines 30, 32. A battery 46 may be operatively connected to the vehicle controller 44 and may provide power to the vehicle controller 44. In a number of variations, a converter 48 may be operatively connected to the vehicle controller 44. In a number of variations, the axle assembly 24 may provide electric drive in a low voltage system including, but not limited to, a 48 volt system as well as a high voltage system including, but not limited to, a 300-400 volt system. In a number of variations, the axle assembly 24 may also drive the first and second electrical machines 30, 32 which may allow regenerative braking to charge the vehicle battery 46. In a number of variations, the vehicle 20 may be equipped with a second axle assembly 38 which may be driven by a conventional power plant which may drive a third and fourth wheel 40, 42 to accomplish all-wheel drive.

In a number of variations, the use of the twin system transmission 22 may allow for the use of more compact high or low voltage electrical machines in place of larger high or low voltage electrical machines. In a number of variations, the twin system transmission 22 may also improve efficiency by reducing energy consumption and may provide improved vehicle performance.

Figure 2:
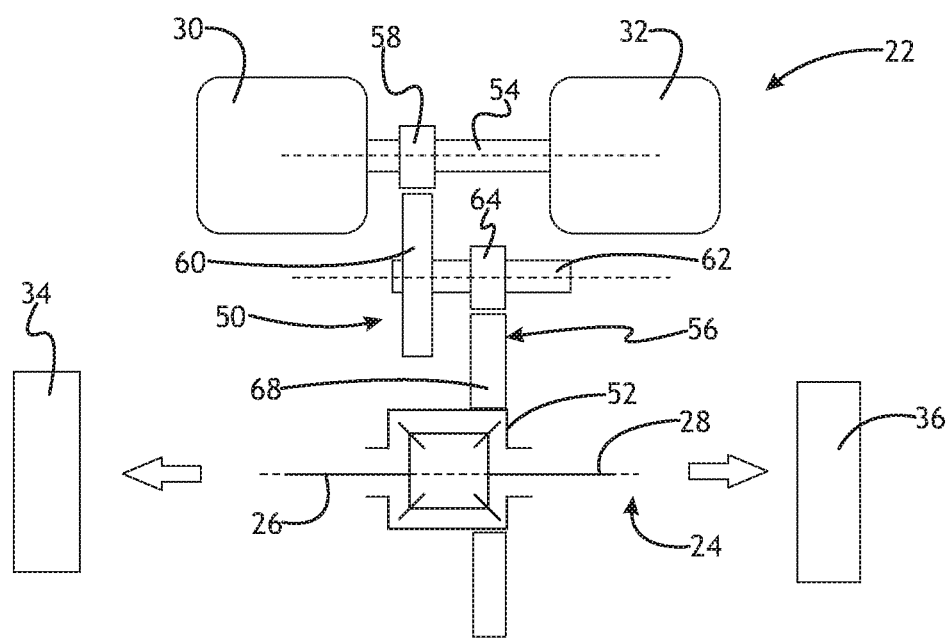
FIG. 2 illustrates a power flow for a single speed transmission according to a number of variations.
Figure 3:
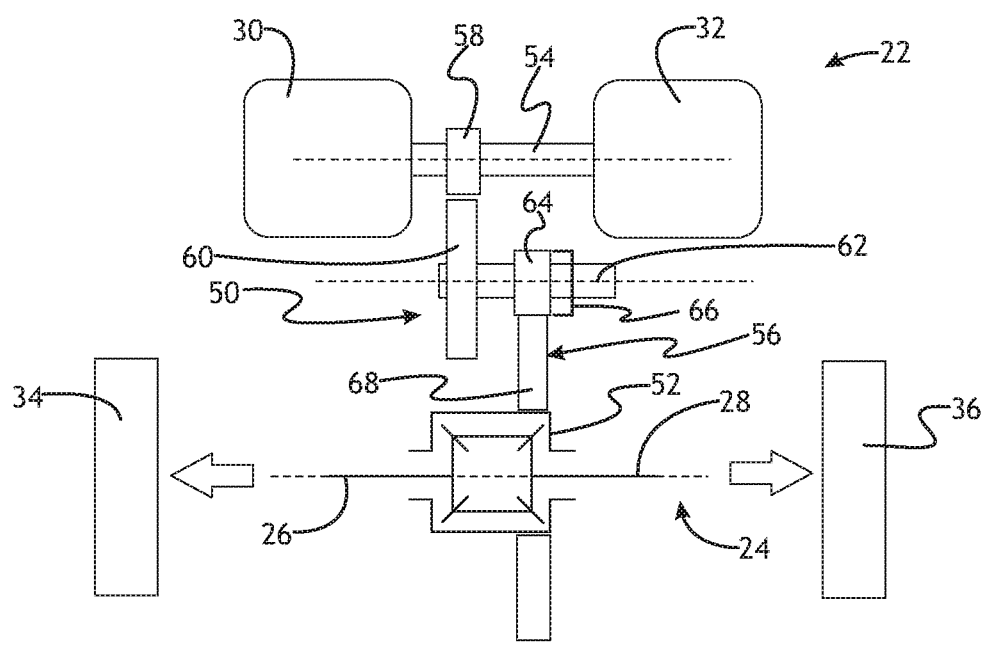
FIG. 3 illustrates a power flow for a single speed transmission according to a number of variations.

Referring to FIGS. 2 and 3, in a number of variations, the twin system transmission 22 may comprise the first electrical machine 30 and the second electrical machine 32 which may be operatively connected to the single speed gearbox 50 which may provide power to the axle assembly 24 through the gearbox 50 and the differential 52. In a number of variations, an input shaft 54 may extend between the first electrical machine 30 and the second electrical machine 32 and may be driven by the first and second electrical machines 30, 32. In a number of variations, the input shaft 54 may be operatively attached to the single speed gearbox 50. The single speed gearbox 50 may comprise any number of gear trains 56 including, but not limited to, pinion, planetary, or helical.

In a number of variations, the gear train 56 may comprise a first gear 58 which may be operatively connected to the input shaft 54 so that the first gear 58 may rotate with the input shaft 54. A second gear 60 may engage the first gear 58 so that the second gear 60 may be driven by the first gear 58. In a number of variations, the second gear 60 may be operatively connected to an intermediate shaft 62 so that the second gear 60 may rotate with the intermediate shaft 62. A third gear 64 may also be operatively connected to the intermediate shaft 62 so that the third gear 64 may rotate with the intermediate shaft 62. In a number of variations, a ring gear 68 may engage the third gear 64 so that the ring gear 68 may be driven by the third gear 64. In a number of variations, the ring gear 68 may be operatively connected to the differential 52 so that the differential 52 may be driven by the ring gear 68. The differential 52 may then drive the first wheel 34 which may be operatively connected to the first axle shaft 26 and the second wheel 36 which may be operatively connected to the second axle shaft 28.

In a number of variations, the first, second, and third gears 58, 60, 64 may increase torque on the ring gear 68 and may reduce the speed to the first and second axle shafts 26, 28 reducing the speed of the first wheel 34 and the second wheel 36. In a number of variations, power may be transferred through the single speed gearbox 50 so that the first electrical machine 30 and the second electrical machine 32 drive the axle assembly 24 such as for propulsion, and power may also be transferred through the single speed gearbox 50 so that the axle assembly 24 may drive the first and second electrical machines 30, 32, such as for regenerative braking.

Referring to FIG. 3, in a number of variations, a disconnect clutch 66 may be operatively connected to the third gear 64 so that the third gear 64 may be selectively attached to the intermediate shaft 62 to rotate with the intermediate shaft 62 so that power from the first and second electrical machines 30, 32 may be transferred to the differential 52 or so that the third gear 64 may rotate freely on the intermediate shaft 62 so that power from the first and second electrical machines 30, 32 may not be transferred to the differential 52 for a neutral mode. Any number of disconnect clutches 66 may be used including, but not limited to, a dog clutch, a synchronizer, or an electromagnetic clutch.

Figure 4:
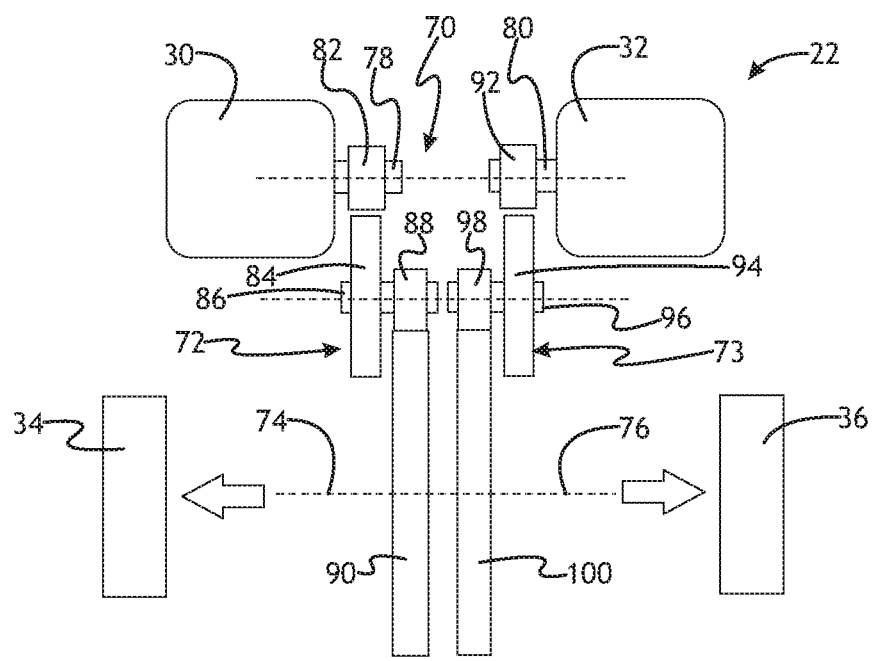
FIG. 4 illustrates a power flow for a single speed transmission according to a number of variations.

Referring to FIG. 4, in a number of variations, the twin system transmission 22 may comprise the first electrical machine 30 and second electrical machine 32 which may be operatively connected to a single speed gearbox 70. In a number of variations, the single speed gearbox 70 may comprise a first gear train 72 and a second gear train 73. Any number of gear trains 72, 73 may be used including, but not limited to, planetary, helical, or pinion gear trains. In a number of variations, the first electrical machine 30 may provide power to a first axle assembly 74 through the first gear train 72 to drive the first wheel 34, and the second electrical machine 32 may provide power to a second axle assembly 76 through the second gear train 73 to drive the second wheel 36.

In a number of variations, the first electrical machine 30 may include a first input shaft 78 which may extend from the first electrical machine 30. The first input shaft 78 may be operatively attached to a first gear 82 of the first gear train 72 so that the first gear 82 may rotate with the first input shaft 78. A second gear 84 may engage the first gear 82 so that the second gear 84 may be driven by the first gear 82. In a number of variations, the second gear 84 may be operatively connected to a first intermediate shaft 86 so that the second gear 84 may rotate with the first intermediate shaft 86. A third gear 88 may also be operatively connected to the first intermediate shaft 86 so that the third gear 88 may rotate with the first intermediate shaft 86. In a number of variations, a first ring gear 90 may engage the third gear 88 so that the first ring gear 90 may be driven by the third gear 88. In a number of variations, the first ring gear 90 may be operatively connected to the first axle assembly 74 so that the output from the first ring gear 90 may drive the first axle assembly 74. In a number of variations, the first axle assembly 74 may drive the first wheel 34 which may be operatively connected to the first axle assembly 74.

In a number of variations, the second electrical machine 32 may include a second input shaft 80 which may extend from the second electrical machine 32. In a number of variations, the second input shaft 80 may be operatively attached to a fourth gear 92 of the second gear train 73 so that the fourth gear 92 may rotate with the second input shaft 80. A fifth gear 94 may engage the fourth gear 92 so that the fifth gear 94 may be driven by the fourth gear 92. In a number of variations, the fifth gear 94 may be operatively connected to a second intermediate shaft 96 so that the fifth gear 94 may rotate with the second intermediate shaft 96. A sixth gear 98 may also be operatively connected to the second intermediate shaft 96 so that the sixth gear 98 may rotate with the second intermediate shaft 96. In a number of variations, a second ring gear 100 may engage the sixth gear 98 so that the second ring gear 100 may be driven by the sixth gear 98. In a number of variations, the second ring gear 100 may be operatively connected to the second axle assembly 76 so that the output from the second ring gear 100 may drive the second axle assembly 76. In a number of variations, the second axle assembly 76 may drive the second wheel 36 which may be operatively connected to the second axle assembly 76.

In a number of variations, power may be transferred through the single speed gearbox 70 so that the first electrical machine 30 and the second electrical machine 32 may drive the first and second axle assemblies 74, 76, respectively, such as for propulsion, and power may also be transferred through the single speed gearbox 70 so that the axle assemblies 74, 76 drive the first and second electrical machines 30, 32, respectively, such as for regenerative braking. In a number of variations, the first, second, and third gears 82, 84, 88 may increase torque on the first ring gear 90 and may reduce the speed to the first axle assembly 74 reducing the speed of the first wheel 34, and the fourth, fifth, and sixth gears 92, 94, 98 may increase torque on the second ring gear 100 which may reduce the speed to the second axle assembly 76 reducing the speed of the second wheel 36. In a number of variations, torque vectoring may be achieved by controlling the first and second electrical machine 30, 32 independently with the vehicle controller 44 which may allow one output side to over speed the other output side.

Figure 5:
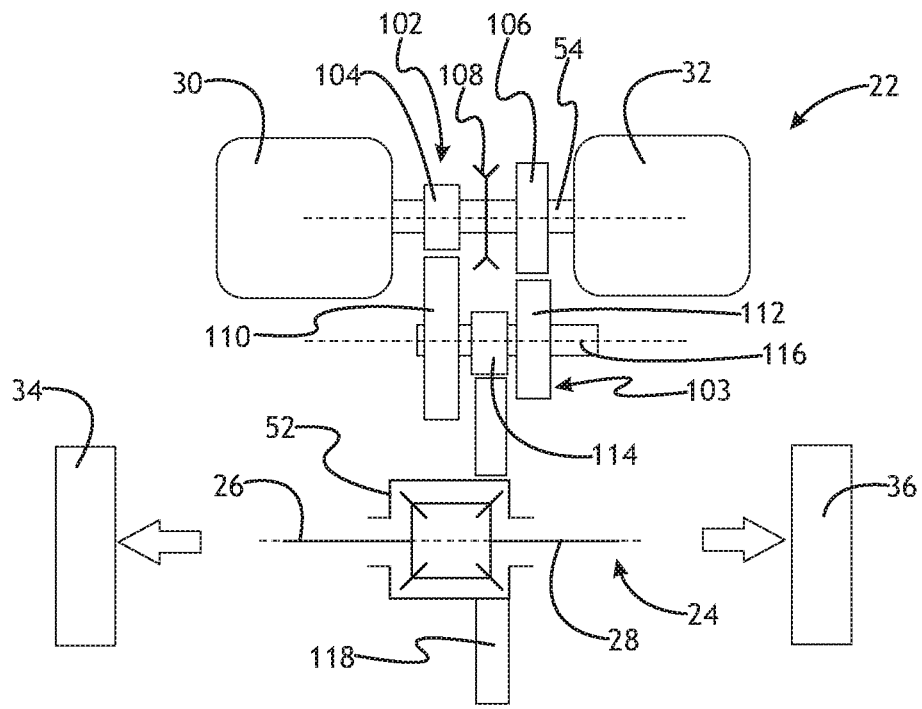
FIG. 5 illustrates a power flow for a two speed transmission according to a number of variations.

Referring to FIG. 5, in a number of variations, the twin system transmission 22 may comprise the first electrical machine 30 and the second electrical machine 32 which may be operatively connected to a two speed gearbox 102 and may provide power to the axle assembly 24 through the two speed gearbox 102 and the differential 52. The input shaft 54 may extend between the first electrical machine 30 and the second electrical machine 32.

In a number of variations, the input shaft 54 may be operatively attached to the two speed gearbox 102. The two speed gearbox 102 may comprise any number of gear trains 103 including, but not limited to, pinion, planetary, or helical.

In a number of variations, the gear train 103 may comprise a first gear 104 and a second gear 106 which may each freely rotate on the input shaft 54. In a number of variations, a shifter 108 may be operatively connected to the first gear 104 and the second gear 106 and may be constructed and arranged to selectively connect the first gear 104 to the input shaft 54 to drive the input shaft 54 to a first speed or to connect the second gear 106 to the input shaft 54 to drive the input shaft 54 to a second speed. The shifter 108 may also remain in a position between the first and second gears 104, 106 so that neither the first gear 104 or the second gear 106 rotate so that power from the first and second electrical machines 30, 32 may not be transferred to the differential 52 to achieve a neutral mode. Any number of shifters 108 may be used including, but not limited to, a clutch or synchronizer.

In a number of variations, a third gear 110, fourth gear 112, and a fifth gear 114 may be attached to an intermediate shaft 116. The third gear 110 may be constructed and arranged to engage and be driven by the first gear 104 and the fourth gear 112 may be constructed and arranged to engage and be driven by the second gear 106. In a number of variations, the fifth gear 114 may be positioned between the third and fourth gear 110, 112 and may be operatively attached to a ring gear 118. In a number of variations, the fifth gear 114 may be constructed and arranged to be driven by the third or fourth gear 110, 112 through the intermediate shaft 116. In a number of variations, the fifth gear 114 may be constructed and arranged to drive the ring gear 118.

In a number of variations, the ring gear 118 may be operatively connected to the differential 52 of the axle assembly 24 so that the differential 52 may be driven by the output of the ring gear 118. The differential 52 may drive the first axle shaft 26 operatively attached to the first wheel 34 and the second axle shaft 28 operatively attached to the second wheel 36. In a number of variations, the first, second, third, fourth, and fifth gears 104, 106, 110, 112, 114 may increase torque on the ring gear 118 and may reduce the speed to the axle assembly 24 which may reduce the speed of the first wheel 34 and the second wheel 36. In a number of variations, power may be transferred through the two speed gearbox 102 so that the first electrical machine 30 and the second electrical machine 32 drive the axle assembly 24 individually, and so that the shifter 108 may be used to shift the twin system transmission 22 between a first speed and a second speed. Power may also be transferred through the two speed gearbox 102 so that the axle assembly 24 drives the first and second electrical machines 30, 32, such as for regenerative braking.

Figure 6:
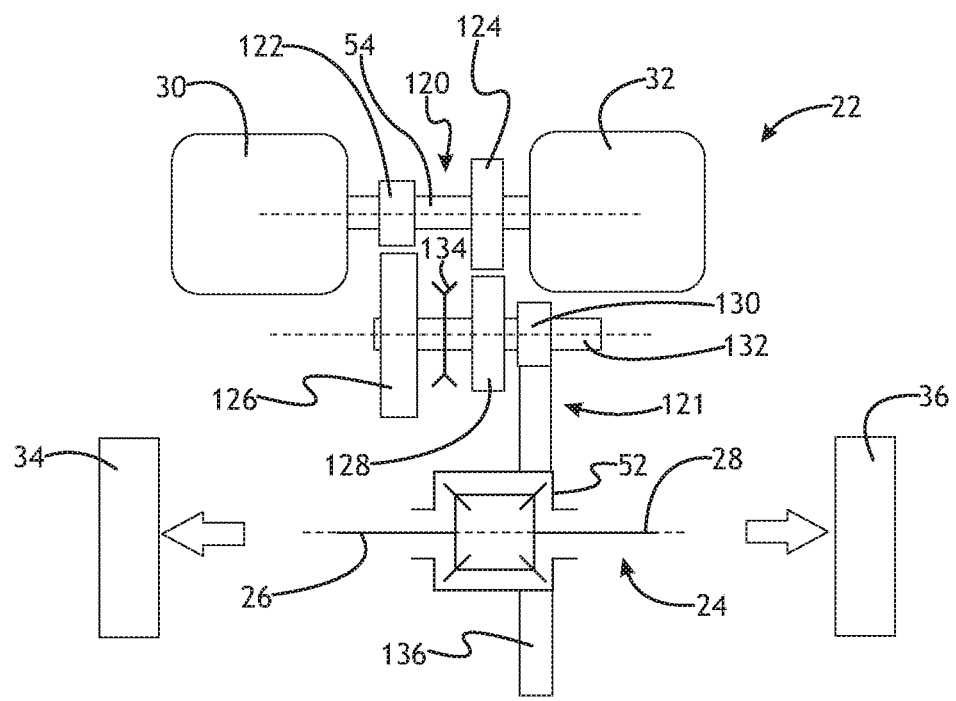
FIG. 6 illustrates a power flow for a two speed transmission according to a number of variations.

Referring to FIG. 6, in a number of variations, the twin system transmission 22 may comprise the first electrical machine 30 and the second electrical machine 32 which may be operatively connected to a two speed gearbox 120 and may provide power to the axle assembly 24 through the two speed gearbox 120. The input shaft 54 may extend between the first electrical machine 30 and the second electrical machine 32. In a number of variations, the input shaft 54 may be operatively attached to the two speed gearbox 120.

The two speed gearbox may comprise any number of gear trains 121 including, but not limited to, pinion, planetary, or helical.

In a number of variations, the gear train 121 may comprise a first gear 122 and a second gear 124 which may each be operatively connected to the input shaft 54 so that the first and second gears 122, 124 may rotate with the input shaft 54. In a number of variations, a third, fourth, and fifth gear 126, 128, 130 may be operatively attached to an intermediate shaft 132. In a number of variations, the first gear 122 may engage the third gear 126 so that the first gear 122 may drive the third gear 126. In a number of variations, the second gear 124 may engage the fourth gear 128 so that the second gear 124 may drive the fourth gear 128. In a number of variations, the fifth gear 130 may be operably connected to the intermediate shaft 132 so that it may be driven by the third and fourth gear 126, 128 through the intermediate shaft 132. The third and fourth gears 126, 128 may be operably connected to the intermediate shaft 132 so that they may each rotate freely on the intermediate shaft 132. In a number of variations, a shifter 134 may be operatively connected to the third gear 126 and the fourth gear 128 so that the shifter 134 may selectively connect the third gear 126 to the input shaft 54 to drive the intermediate shaft 132 for a first speed, so that shifter 134 may connect the fourth gear 128 to the intermediate shaft 132 to drive the intermediate shaft 132 for a second speed, or so the shifter 134 may remain in a position between the third and fourth gears 126, 128 so that power may not be transferred from the first and the second electrical machine 30, 32 to the differential 52 to achieve a neutral mode. Any number of shifters 134 may be used including, but not limited to, a clutch or synchronizer.

In a number of variations, the fifth gear 130 may be constructed and arranged to engage a ring gear 136 so that it may drive the ring gear 136. In a number of variations, the fifth gear 130 may be positioned adjacent the fourth gear 128 opposite of the third gear 126. In a number of variations, the ring gear 136 may be operatively connected to the differential 52 of the axle assembly 24 so that the differential 52 may be driven by the output of the ring gear 136. The differential 52 may then drive the first wheel 34 which may be operatively connected to the first axle shaft 26 and the second wheel 36 which may operatively connected to the second axle shaft 28. In a number of variations, the first, second, third, fourth, and fifth gears 122, 124, 126, 128, 130 may increase torque on the ring gear 136 and may reduce speed to the axle assembly 24 which may reduce the speed of the first wheel 34 and the second wheel 36. In a number of variations, power may be transferred through the two speed gearbox 120 so that the first electrical machine 30 and the second electrical machine 32 each drive the axle assembly 24 individually and so that the two speed gearbox 120 may be shifted between a first speed, a second speed, and a neutral mode by the shifter 134. Power may also be transferred through the two speed gearbox 120 so that the axle assembly 24 drives the first and second electrical machines 30, 32, such as for regenerative braking.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly.

Variation 2 may include a product as set forth in Variation 1 wherein the gearbox is a single speed gearbox.

Variation 3 may include a product as set forth in any of Variations 1-2 wherein the single speed gearbox is constructed and arranged to selectively disconnect power from the first electrical machine and the second electrical machine to the axle assembly.

Variation 4 may include a product as set forth in Variation 1 wherein the gearbox is a two speed gearbox.

Variation 5 may include a product as set forth in any of Variations 1-4 wherein the first electrical machine and the second electrical machine are high voltage motors/generators.

Variation 6 may include a product as set forth in any of Variations 1-4 wherein the first electrical machine and the second electrical machine are low voltage motors/generators.

Variation 7 may include a product as set forth in any of Variations 1-6 wherein the first electrical machine and the second electrical machine drive the gearbox with at least one input shaft.

Variation 8 may include a product as set forth in Variation 7 wherein the axle assembly further comprises a differential and at least one axle shaft operatively connected to the differential.

Variation 9 may include a product as set forth in any of Variations 1-8 wherein the gearbox comprises a first gear operatively connected to an input shaft to rotate with the input shaft, a second gear and a third gear operably connected to an intermediate shaft to rotate with the intermediate shaft, and a ring gear operably attached to the third gear and the axle assembly; wherein the first gear is constructed and arranged to be driven by the input shaft, the second gear is constructed and arranged to be driven by the first gear, the third gear is constructed and arranged to be driven by the second gear through the intermediate shaft, the ring gear is constructed and arranged to be driven by the third gear, and the axle assembly is constructed and arranged to be driven by the ring gear.

Variation 10 may include a product as set forth in Variation 9 further comprising a disconnect clutch, wherein the disconnect clutch is operably attached to the third gear and is constructed and arranged to connect and disconnect the third gear from rotating the intermediate shaft.

Variation 11 may include a product as set forth in any of Variations 1-8 wherein the gearbox comprises a first gear train and a second gear train, wherein the first gear train is operably attached to the first electrical machine and wherein the second gear train is operably attached to the second gear train; wherein the first gear train drives a first axle shaft and the second gear train drives a second axle shaft; and wherein the first electrical machine and the second electrical machine are controlled independently by a vehicle controller.

Variation 12 may include a product as set forth in any of Variations 1-8 wherein the first and the second gear train each comprise a first gear operatively connected to an input shaft to rotate with the input shaft, a second gear and a third gear operably connected to an intermediate shaft to rotate with the intermediate shaft, and a ring gear operably attached to the third gear and the axle assembly; wherein the first gear is constructed and arranged to be driven by the input shaft, the second gear is constructed and arranged to be driven by the first gear, the third gear is constructed and arranged to be driven by the second gear through the intermediate shaft, the ring gear is constructed and arranged to be driven by the third gear, and the axle assembly is constructed and arranged to be driven by the ring gear.

Variation 13 may include a product as set forth in any of Variations 1-8 wherein the gearbox comprises a first gear, a second gear, and a shiftable clutch operatively connected to an input shaft, wherein the shiftable clutch is positioned between the first gear and the second gear and is constructed and arranged to selectively connect the first gear to rotate with the input shaft or to selectively connect the second gear to rotate with the input shaft; a third gear, a fourth gear, and a fifth gear operably connected to an intermediate shaft to rotate with the intermediate shaft; and a ring gear operably attached to the third gear and the axle assembly; wherein the first gear is constructed and arranged to selectively drive the third gear, the second gear is constructed and arranged to selectively drive the fourth gear, the third gear and the fourth gear are constructed and arranged to selectively drive the fifth gear through the intermediate shaft, the fifth gear is constructed and arranged to drive the ring gear, and the ring gear is constructed and arranged to drive the axle assembly.

Variation 14 may include a product as set forth in Variation 13 wherein the fifth gear is positioned between the third and the fourth gear.

Variation 15 may include a product as set forth in any of Variations 1-8 wherein the gearbox comprises a first gear and a second gear operably connected to an input shaft to rotate with the input shaft; a third gear, a fourth gear, a fifth gear, and a shiftable clutch operatively connected to an intermediate shaft, wherein the shiftable clutch is positioned between the third gear and the fourth gear and is constructed and arranged to selectively connect the third gear to rotate with the input shaft or to selectively connect the second gear to rotate with the input shaft; and a ring gear operably attached to the fifth gear and the axle assembly; wherein the first gear is constructed and arranged to drive the third gear, the second gear is constructed and arranged to drive the fourth gear, the third and the fourth gear are constructed and arranged to selectively drive the fifth gear through the intermediate shaft, the fifth gear is constructed and arranged to drive the ring gear, and the ring gear is constructed and arranged to drive the axle assembly.

Variation 16 may include a product as set forth in Variation 15 wherein the fifth gear is positioned adjacent the fourth gear opposite of the third gear. Variation 17 may include a product comprising: a first electrical machine and a second electrical machine operatively connected to at least one input shaft; a gearbox comprising at least one gear train, wherein the gearbox is operatively connected to the at least one input shaft; and at least one axle assembly operably connected to the gearbox; wherein the first electrical machine and the second electrical machine are constructed and arranged to drive the gearbox; and wherein the gearbox is constructed and arranged to drive the at least one axle assembly.

Variation 18 may include a product as set forth in Variation 17 wherein the first electrical machine and the second electrical machine are high voltage electrical machines.

Variation 19 may include a product as set forth in Variation 17 wherein the first electrical machine and the second electrical machine are low voltage electrical machines.

Variation 20 may include a method for driving a first wheel and a second wheel comprising: providing a first electrical machine and a second electrical machine; driving a gearbox with output from the first and the second electrical machine; driving at least one axle assembly with output from the gearbox; and driving a first wheel and a second wheel with output from the at least one axle assembly.

The above description of select variations within the scope of the invention is merely illustrative in nature and, thus, variations or variants thereof are not to be regarded as a departure from the spirit and scope of the invention.

What is claimed is:

1. A product comprising: a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly, wherein the gearbox comprises a first gear directly connected to an input shaft to rotate with the input shaft, a second gear directly connected to the first gear and to an intermediate shaft, a third gear directly connected to the intermediate shaft such that the second gear and the third gear to rotate with the intermediate shaft, and a ring gear operably attached to the third gear and the axle assembly; wherein the first gear is constructed and arranged to be driven by the input shaft, the second gear is constructed and arranged to be driven by the first gear, the third gear is constructed and arranged to be driven by the second gear through the intermediate shaft, the ring gear is constructed and arranged to be driven by the third gear, and the axle assembly is constructed and arranged to be driven by the ring gear.

2. The product of claim 1 further comprising a disconnect clutch, wherein the disconnect clutch is operably attached to the third gear and is constructed and arranged to connect and disconnect the third gear from rotating the intermediate shaft.

3. A product comprising: a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly, wherein the gearbox comprises a first gear train and a second gear train, wherein the first gear train is operably attached to the first electrical machine and wherein the second gear train is operably attached to the second gear train; wherein the first gear train drives a first axle shaft and the second gear train drives a second axle shaft; and wherein the first electrical machine and the second electrical machine are controlled independently by a vehicle controller.

4. The product of claim 3 wherein the first and the second gear train each comprise a first gear operatively connected to an input shaft to rotate with the input shaft, a second gear and a third gear operably connected to an intermediate shaft to rotate with the intermediate shaft, and a ring gear operably attached to the third gear and the axle assembly; wherein the first gear is constructed and arranged to be driven by the input shaft, the second gear is constructed and arranged to be driven by the first gear, the third gear is constructed and arranged to be driven by the second gear through the intermediate shaft, the ring gear is constructed and arranged driven by the third gear, and the axle assembly is constructed and arranged to be driven by the ring gear.

5. A product comprising: a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly, wherein the gearbox comprises a first gear, a second gear, and a shiftable clutch operatively connected to an input shaft, wherein the shiftable clutch is positioned between the first gear and the second gear and is constructed and arranged to selectively connect the first gear to rotate with the input shaft or to selectively connect the second gear to rotate with the input shaft; a third gear, a fourth gear, and a fifth gear operably connected to an intermediate shaft to rotate with the intermediate shaft; and a ring gear operably attached to the third gear and the axle assembly; wherein the first gear is constructed and arranged to selectively drive the third gear, the second gear is constructed and arranged to selectively drive the fourth gear, the third gear and the fourth gear are constructed and arranged to selectively drive the fifth gear through the intermediate shaft, the fifth gear is constructed and arranged to drive the ring gear, and the ring gear is constructed and arranged to drive the axle assembly.

6. The product of claim 5 wherein the fifth gear is positioned between the third and the fourth gear.

7. A product comprising: a first electrical machine and a second electrical machine operatively connected to a gearbox; at least one axle assembly operably attached to the gearbox; wherein the first electrical machine and the second electrical machine are constructed and arranged to drive the gearbox; and wherein the gearbox is constructed and arranged to drive the axle assembly, wherein the gearbox comprises a first gear and a second gear operably connected to an input shaft to rotate with the input shaft; a third gear, a fourth gear, a fifth gear, and a shiftable clutch operatively connected to an intermediate shaft, wherein the shiftable clutch is positioned between the third gear and the fourth gear and is constructed and arranged to selectively connect the third gear to rotate with the input shaft or to selectively connect the second gear to rotate with the input shaft; and a ring gear operably attached to the fifth gear and the axle assembly; wherein the first gear is constructed and arranged to drive the third gear, the second gear is constructed and arranged to drive the fourth gear, the third and the fourth gear are constructed and arranged to selectively drive the fifth gear through the intermediate shaft, the fifth gear is constructed and arranged to drive the ring gear, and the ring gear is constructed and arranged to drive the axle assembly.

8. The product of claim 7 wherein the fifth gear is positioned adjacent the fourth gear opposite of the third gear.

* * * * *